(12) United States Patent
Laitinen et al.

(10) Patent No.: US 8,630,169 B2
(45) Date of Patent: Jan. 14, 2014

(54) METHOD AND APPARATUS FOR CONTROLLING A TEMPERATURE OF A PACKET COMMUNICATIONS DEVICE

(75) Inventors: Pasi Petteri Laitinen, Oulunsalo (FI); Jarkko Juhani Eskelinen, Oulu (FI)

(73) Assignee: Nokia Corporation, Espoo (FI)

( * ) Notice: Subject to any disclaimer, the term of this patent is extended or adjusted under 35 U.S.C. 154(b) by 558 days.

(21) Appl. No.: 12/713,159

(22) Filed: Feb. 25, 2010

(65) Prior Publication Data
US 2011/0205888 A1 Aug. 25, 2011

(51) Int. Cl.
*G01R 31/08* (2006.01)
*H04L 12/56* (2011.01)

(52) U.S. Cl.
CPC ...................................... *H04L 47/10* (2013.01)
USPC ......................................................... 370/230

(58) Field of Classification Search
CPC ....................................................... H04L 47/10
USPC ......................................................... 370/230
See application file for complete search history.

(56) References Cited

U.S. PATENT DOCUMENTS

| | | | |
|---|---|---|---|
| 6,574,209 B1 * | 6/2003 | Kosaka | 370/342 |
| 6,711,493 B1 * | 3/2004 | Andrews et al. | 701/117 |
| 7,590,064 B1 * | 9/2009 | Zhang et al. | 370/235 |
| 7,936,678 B2 * | 5/2011 | Paloheimo et al. | 370/235 |
| 8,045,969 B2 * | 10/2011 | Jin et al. | 455/418 |
| 2004/0174833 A1 * | 9/2004 | Raith | 370/311 |
| 2006/0003711 A1 * | 1/2006 | Ouzillou et al. | 455/115.1 |
| 2007/0258370 A1 * | 11/2007 | Kondapalli | 370/234 |
| 2008/0274795 A1 * | 11/2008 | Carpenter et al. | 463/25 |
| 2008/0319701 A1 * | 12/2008 | Brandl et al. | 702/130 |
| 2009/0196176 A1 * | 8/2009 | Nishimura | 370/230.1 |
| 2010/0127881 A1 * | 5/2010 | Schechter et al. | 340/584 |
| 2011/0238227 A1 * | 9/2011 | Hern et al. | 700/284 |

\* cited by examiner

*Primary Examiner* — Phuongchau B Nguyen
(74) *Attorney, Agent, or Firm* — Mintz, Levin, Cohn, Ferris, Glovsky & Popeo, P.C.

(57) ABSTRACT

In accordance with an example embodiment of the present invention, a communications apparatus participates in a packet-based communication, obtains a temperature of the apparatus, and compares the temperature of the apparatus to a threshold temperature, and responsive to a result of the comparison, the apparatus starts dropping packets pertaining to the packet-based communication in the protocol layer.

16 Claims, 4 Drawing Sheets

METHOD AND APPARATUS FOR CONTROLLING A TEMPERATURE OF A PACKET COMMUNICATIONS DEVICE

TECHNICAL FIELD

The present application relates generally to packet-based communication and managing a temperature of an apparatus comprising a packet-based receiver and/or transmitter.

BACKGROUND

The present application relates to packet communication, for example high-speed cellular packet radio communication in the context of cellular communications networks, wireless local area communication or wire-line packet-based communication. Packet-based communication may comprise transmitting and receiving data using transmission control protocol, TCP, over internet protocol, IP for effecting communications.

Packet-based communication comprises transmitting information in packets, the packets comprising addressing information indicating at least a recipient of the packets. Nodes in packet-switched networks receive and forward packets based on the addressing information. Depending on the amount of traffic and capacities of links interconnecting nodes in a packet-switched network, the network may become congested.

The TCP protocol comprises congestion control methods which control the communications rate dynamically to adapt to changing network conditions, such as congestion or link instability, for example. Another example of a packet-based protocol is the user datagram protocol, UDP, which supports application-level congestion control.

SUMMARY

Various aspects of examples of the invention are set out in the claims.

According to a first aspect of the present invention, there is provided a method, comprising causing an apparatus to participate in a packet-based communication, obtaining a temperature of the apparatus and comparing the temperature of the apparatus to a threshold temperature, and responsive to a result of the comparison, causing the apparatus to start dropping packets pertaining to the packet-based communication.

In an embodiment of the first aspect, apparatus starts dropping packets responsive to the temperature exceeding the threshold temperature According to a second aspect of the present invention, there is provided an apparatus, comprising logic circuitry configured to cause the apparatus to participate in packet-based communication, a temperature sensor operably connected to the logic circuitry, configured to provide a temperature of the apparatus to the logic circuitry, memory operably connected to the logic circuitry, configured to store a threshold temperature, the logic circuitry being configured to compare the temperature of the apparatus to the threshold temperature, and responsive to a result of the comparison, to cause the apparatus to start dropping packets pertaining to the packet-based communication According to a third aspect of the present invention, there is provided a computer program product comprising a computer-readable medium bearing computer program code embodied therein for use with a computer, the computer program code comprising code for causing an apparatus to participate in a packet-based communication, code for obtaining a temperature of the apparatus, and code for comparing the temperature of the apparatus to a threshold temperature, and responsive to a result of the comparison, causing the apparatus to start dropping packets pertaining to the packet-based communication.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4 of the drawings.

Figure 1:
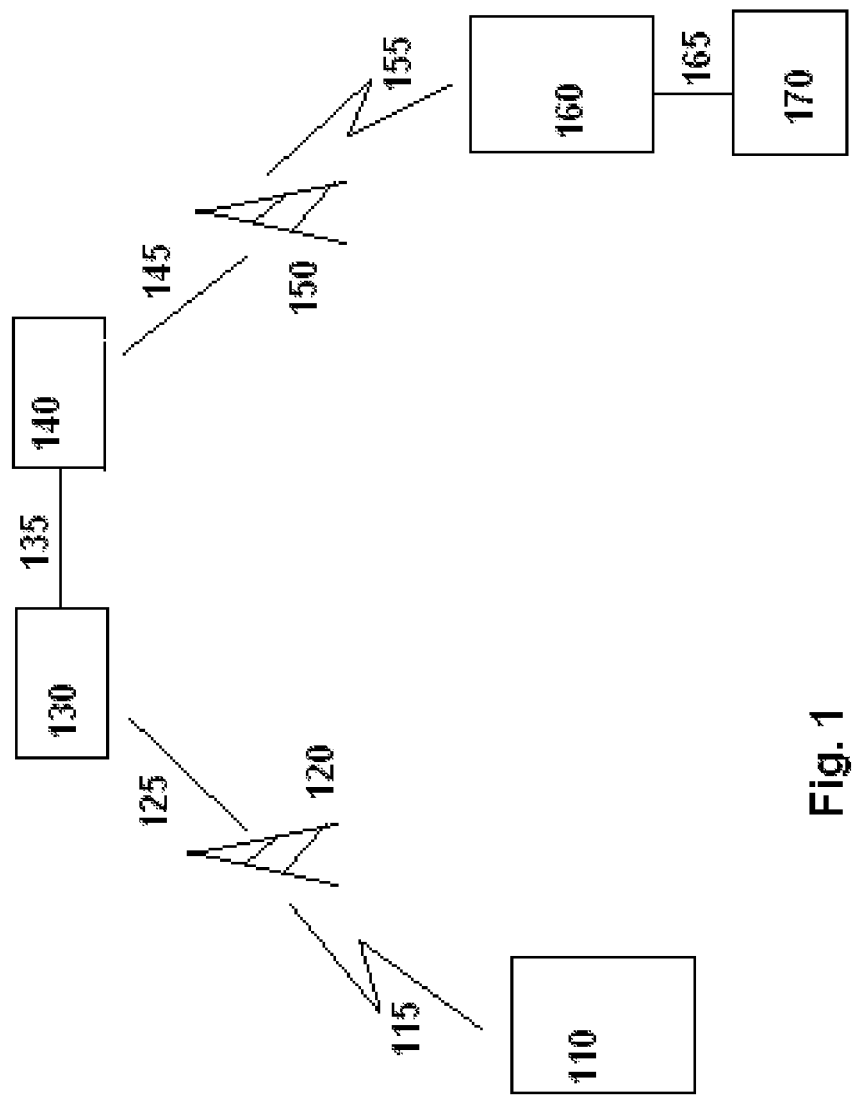
FIG. 1 illustrates an example embodiment of a packet-switched network supporting embodiments of the invention.

FIG. 1 illustrates an example embodiment of a packet-switched network supporting embodiments of the invention. Device 110 may be a cellular telephone, personal digital assistant, laptop or other electronic device capable of packet-based communication. Device 110 may be arranged to communicate with a base station 120 by means of a radio link 115. The radio link 115 may be based on, for example, code division multiple access, CDMA, or orthogonal frequency division multiple access, OFDMA, technologies. In some embodiments, communication between device 110 and other devices may be based on communication wires or cables instead of radio waves.

In the example illustrated in FIG. 1, base station 120 is connected to network node 130 by means of communication cable 125. In some embodiments, connection 125 may be based on, for example, a microwave link instead of a communication cable. Network node 130 may be connected to a further network node 140, for example by a link 135 which may be similar to link 125. In some embodiments, link 135 may have higher capacity than link 125. Network node 140 may be connected to base station 150 by a link 145, which again may be similar to links 125 and/or 135. In some embodiments, there may be a single network node 130 instead of network nodes 130 and 140, and in further embodiments there may be more network nodes than are illustrated in FIG. 1. Examples of possible network nodes 130 and/or 140 include switches, radio network controllers and gateways.

Base station 150 may communicate with device 160 via a radio link 155, which may be similar to radio link 115. Radio link 155 may also be based on a different radio technology than link 115, for example if devices 110 and 160 are attached to different radio access systems. In some embodiments, device 110 may be a radio device and device 160 may be connected via a wired connection. Device 170 may also be comprised inside device 160. Device 160 may be connected to a further device 170 by means of a wired or wireless connection 165. Device 160 may be a modem apparatus, or intermediary apparatus, of device 170.

Devices 110 and 170 may be endpoints of a packet connection, for example a TCP or UDP connection, or act as intermediate nodes in a packet connection transfer path. When acting as an endpoint, device 110 transmits packets to base station 120, which forwards them toward device 170 via network nodes 130 and 140, and base station 150. Packets transmitted by device 160 toward 110 may take the same route in the opposite direction, or they may take another route to device 110 through the packet-switched network. Other routes are not illustrated in FIG. 1.

Protocols such as TCP and applications using UDP, for example, comprise or allow congestion control mechanisms, such as rate adaptation, slow start and/or congestion avoidance. For example, if link 135 or network node 130 or 140 becomes congested with traffic, the end-to-end connection between device 110 and device 160 may react by decreasing the datarate of the connection. If one of devices 110 and 160 realizes that some packets transmitted from the other end of the connection do not arrive, it may react by assuming the connection suffers from congestion somewhere along the path, and decrease the communication rate.

When communicating, electronic devices supporting packet-based communications consume electrical energy. A part of the consumed electrical energy is transformed into thermal energy. If more thermal energy is created than is dissipated or conducted away from the device, the temperature of the device will increase. Some electrical devices have temperature ranges in which they are designed to operate, and it may occur that a device heats up during use so, that its temperature exceeds a maximum desired temperature. Unwanted consequences of overheating may include heat damage to components of the device or injury to a user of the device, for example a user of a handheld device. Another possible consequence of overheating may be unreliable operation of the device. To avoid overheating, devices may be constrained regarding a transmission rate or power that they are configured to support when communicating. For example, devices sold in areas with a hot climate may be constrained to transmit and/or receive at a lower datarate than devices sold in areas with cooler climates.

A device consumes more power when transmitting at a higher datarate, and conversely a device consumes less power when transmitting at a lower datarate. A device transmitting at a higher datarate is thus more prone to overheating than a device transmitting at a lower datarate. In some cases, it may be desirable to react to a high temperature condition by decreasing a datarate. In embodiments of the invention, a device such as device 110 or device 160 is furnished with a temperature sensor to determine a temperature of the device during use. If the device determines that the temperature has exceeded a threshold temperature, it may initiate a decrease of a datarate. In some embodiments it may initiate a decrease of a datarate by modifying parameters of connection 115, for example parameters of a physical layer or network layer. In other embodiments, it may initiate a decrease of a datarate by modifying an end-to-end protocol connection such as a TCP or UDP connection. In some embodiments, a device may invoke congestion control mechanisms of, for example, a TCP connection to lower a datarate of an end-to-end connection. This may be achieved, for example, by causing packets pertaining to the end-to-end connection to be dropped in the protocol layer. How many packets are dropped may depend on the temperature of the device. For example, if a temperature of the device exceeds a threshold temperature only slightly, fewer packets may be dropped than if the temperature exceeds the threshold temperature by a more significant margin. In some embodiments, the device may obtain repeated estimates of a temperature of the device, spaced over time. Responsive to concluding that the temperature is approaching a threshold, the device may initiate packet dropping to pre-emptively prevent the threshold from being exceeded.

In some embodiments, an intermediary device, for example a middlebox, which may correspond to a controller or chipset of device 160, may decide to react to an overheat condition of the intermediary device by causing packets pertaining to an active connection traversing the intermediary device to be dropped. This may be seen as congestion in the communication path by endpoints of the connection.

Figure 2:
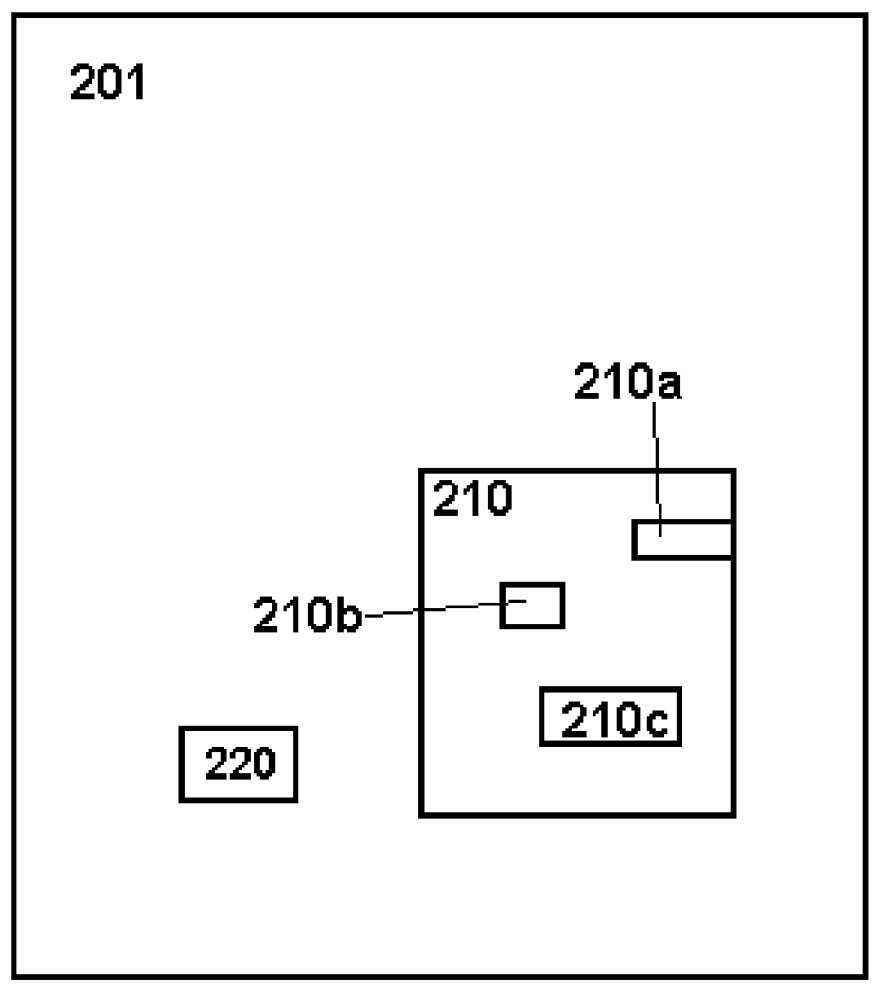
FIG. 2 illustrates an example apparatus capable of supporting embodiments of the present invention.

FIG. 2 illustrates an example apparatus 201 capable of supporting embodiments of the present invention. The apparatus may correspond to device 110 or 160 of FIG. 1 or, for example, an access point or base station or a wireless communication device. The apparatus is a physically tangible object, for example a cellular telephone, personal digital assistant, laptop, portable multimedia computer or other mobile apparatus. The apparatus may comprise a control apparatus 210, for example a digital signal processor (DSP), processor, field-programmable gate array (FPGA), application-specific integrated circuit (ASIC), chipset or controller. The apparatus may further comprise transceiver circuitry 210*a* configured to enable the apparatus 201 to connect to a network. The apparatus may comprise memory 210*b* configured to store information, for example information relating to a threshold value or a delay requirement. The memory may be solid-state memory, dynamic random access memory (DRAM), magnetic, holographic or other kind of memory. The apparatus may comprise logic circuitry 210*c* configured to access the memory 210*b* and control the transceiver circuitry 210*a*. The logic circuitry 210*c* may be implemented as software, hardware or a combination of software and hardware. The logic circuitry 210*c* may execute program code stored in memory 210*b* to control the functioning of the apparatus 201 and cause it to perform functions related to embodiments of the invention. The logic circuitry 210*c* may be configured to initiate functions in the apparatus 201, for example the sending of data units via the transceiver circuitry 210*a*. The logic circuitry 210*c* may be control circuitry. The transceiver circuitry 210*a*, memory 210*b* and/or logic circuitry 210*c* may comprise hardware and/or software elements comprised in the control apparatus 210. Memory 210*b* may be comprised in the control apparatus 210, be external to it or be both external and internal to the control apparatus 210 such that the memory is split to an external part and an internal part. If the apparatus 201 does not comprise a control apparatus 210 the transceiver circuitry 210*a*, memory 210*b* and logic circuitry 210*c* may be comprised in the apparatus as hardware elements such as integrated circuits or other electronic components. The same applies if the apparatus 201 does comprise a control apparatus 210 but some, or all, of the transceiver circuitry 210*a*, memory 210*b* and logic circuitry 210*c* are not comprised in the control apparatus 210. The apparatus may be furnished with a temperature sensor 220. The temperature sensor 220 may be external to the control apparatus 210 or it may be comprised in the control apparatus 210. The temperature sensor 220 may be operably connected to the logic circuitry 210*c* to provide temperature estimates of the apparatus to the logic circuitry 210*c*.

Figure 3:
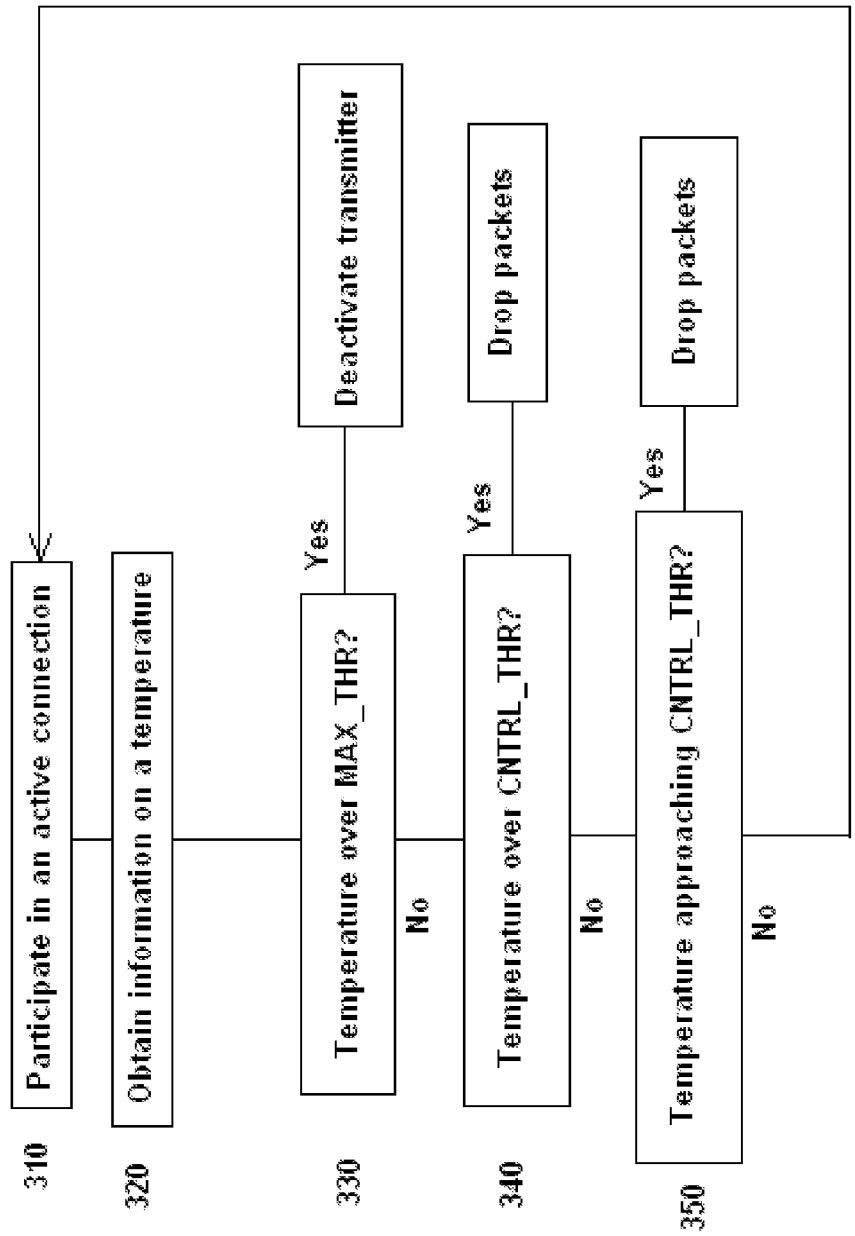
FIG. 3 is a flow diagram showing operations for an example process according to embodiments of the invention.

FIG. 3 is a flow diagram showing operations for an example process according to embodiments of the invention. In phase 310, a device such as, for example, device 110 or 160 of FIG. 1 participates in an active connection, for example an end-to-end protocol-based packet-switched connection such as a TCP connection.

In phase 320, the device obtains a temperature of the device, for example logic circuitry 210*c* obtains a temperature reading from temperature sensor 220. In phase 330, the obtained temperature is compared to a threshold temperature MAX_THR, corresponding to a maximum operating temperature of the device. MAX_THR may be stored in memory 210b and obtained therefrom to the logic circuitry 210c for comparison. Responsive to the temperature exceeding MAX_THR, the logic circuitry may be configured to cause parts of the device that consume electrical power, such as the transmitter and/or receiver, to be switched off. This will sever the ongoing protocol-based connection but may be necessary to prevent damage to components of the device, and/or injury to a user of the device. If it is later determined that the temperature has decreased below MAX_THR, communication may be re-enabled. Phase 330 is optional and not present in all embodiments of the invention.

If the temperature is less than MAX_THR, or phase 330 is not implemented, processing proceeds to phase 340. In phase 340, the obtained temperature is compared to a threshold temperature CNTRL_THR, which is a control threshold and may be lower than a maximum operating temperature MAX_THR. CNTRL_THR may be stored in memory 210b and obtained therefrom to the logic circuitry 210c for comparison. Responsive to the temperature exceeding CNTRL_THR, the device may be configured to limit data traffic pertaining to the active connection. For example, the logic circuitry 210c may be configured to initiate packet dropping to cause the protocol layer of the active connection to reduce a datarate. The packet dropping may follow a predetermined pattern. For example, the protocol layer may cause a congestion window to reduce in size in order to cause an effective datarate of the active connection to decrease. The actions the control circuitry initiates in the device may be seen at the other end of the active connection as equivalent to network congestion. If at a later point in time it is determined, that the temperature of the device has decreased below a further threshold LOW1_THR, packet dropping may be discontinued. Phase 340 is optional and not present in all embodiments of the invention.

If the comparison of phase 340 reveals that the temperature is less than CNTRL_THR, or phase 340 is not implemented, processing proceeds to phase 350. In phase 350, the obtained temperature is compared to temperatures obtained previously, which may be stored, for example, in memory 210b. By comparing temperatures to earlier temperatures, the logic circuitry 210c may determine a rate of change of the temperature. To determine the rate of change, the frequency of temperature estimates may be used. Smoothing may be used to determine an estimate of the rate of change of the temperature that is more stable.

If it is determined in phase 350 that the temperature is relatively close to CNTRL_THR and increasing, the device may be configured to to limit data traffic pertaining to the active connection as described above in connection with phase 340. For example, packet dropping may be initiated responsive to the device determining based on the temperature and the rate of change of the temperature, that the temperature would exceed CNTRL_THR within a predetermined time, in other words responsive to a determination that the temperature is approaching CNTRL_THR. A decrease in datarate triggered in phase 350 may be smaller in magnitude than that triggered in phase 340.

The magnitude of the decrease in datarate may be dependent on how soon the device estimates temperature CNTRL_THR would be exceeded. For example, the magnitude of the decrease in datarate may be larger responsive to a determination that CNTRL_THR would be exceeded soon, and smaller responsive to a determination that CNTRL_THR would be exceeded only after a longer time. For example, a determination that CNTRL_THR would be exceeded in ten seconds may require a larger decrease in datarate than a determination that CNTRL_THR would be exceeded in one minute. The intended magnitude of the decrease in datarate may determine a choice of pattern in dropping packets. Decreasing the datarate gradually may provide a smoother user experience to a user of the device, compared to a sudden drop in datarate or even a severed connection. If at a later point in time it is determined, that the temperature of the device has decreased below a further threshold LOW2_THR, packet dropping may be discontinued. Phase 350 is optional and not present in all embodiments of the invention.

If phase 350 is not implemented or it is not determined in phase 350 that the temperature of the device will exceed CNTRL_THR within the predetermined time, processing returns to phase 310.

Figure 4A:
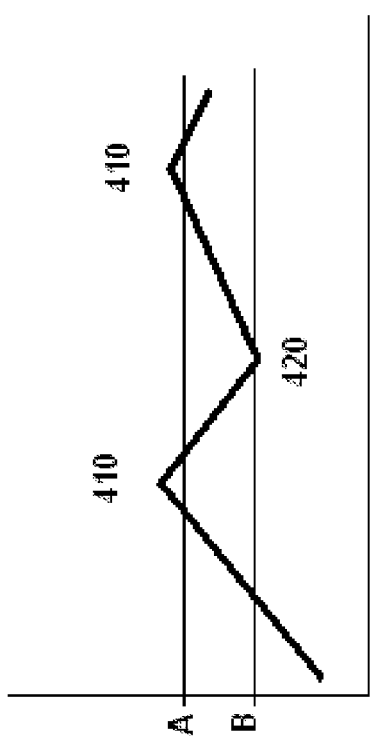
FIG. 4 illustrates two examples of embodiments of the invention.

FIG. 4 illustrates two examples of embodiments of the invention. In FIG. 4A a process according to phase 340 of FIG. 2 is illustrated. In the coordinate system illustrated, temperature is on the vertical axis and time on the horizontal axis. Temperature of the device, as reported by the temperature sensor 220, is illustrated by a thick black line. On the temperature axis, A denotes CNTRL_THR and B denote LOW1_THR. Initially the device is in use, and the temperature is seen increasing toward point 410. At point 410 it is determined that the temperature has exceeded CNTRL_THR, and responsively packet-dropping is initiated to cause a datarate of the active connection to decrease. As energy consumption decreases with datarate, the decreasing datarate causes the device to cool down, as illustrated by the thick line subsequent to point 410. As the temperature of the device drops below LOW1_THR at point 420, packet dropping is in this example discontinued, causing the datarate of the active connection to increase. This may lead to a renewed increase in the temperature of the device, and at the second point 410 dropping is re-commenced to control the temperature once more.

Figure 4B:
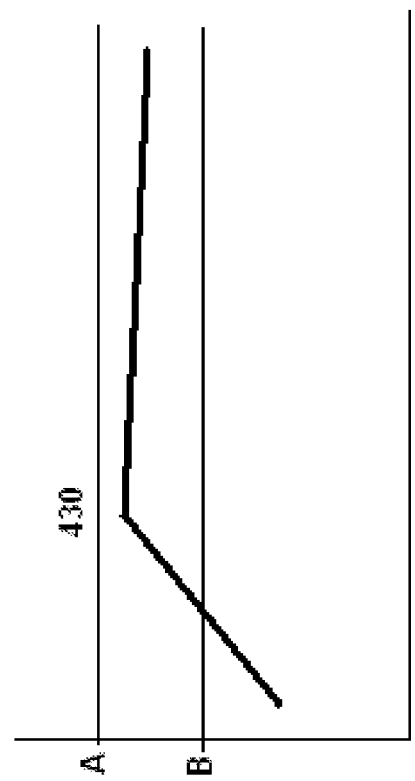

In FIG. 4B a process according to phase 350 of FIG. 2 is illustrated. The coordinate system is the same as that of FIG. 4A, except that here B denotes LOW2_THR. Here, initially the temperature of the device increases as in FIG. 4A. At point 420 it is determined, that in a short while the temperature of the device will exceed CNTRL_THR. Responsive to the determination, packet dropping is commenced at the protocol layer, at a lower rate than in the example of FIG. 4A. Correspondingly, the temperature of the device begins to decline. Since packets are dropped less frequently than in FIG. 4A, the datarate of the active connection decreases less, and correspondingly the temperature of the device declines at a slower rate.

Without in any way limiting the scope, interpretation, or application of the claims appearing below, a technical effect of one or more of the example embodiments disclosed herein is that dropping packets in the protocol layer provides a way to limit a datarate of an end-to-end connection regardless of the specific technology used for connecting the device to another device or network. Another technical effect of one or more of the example embodiments disclosed herein is that by dropping packets as discussed above, both directions of traffic on the end-to-end connection can be affected.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   logic circuitry configured to cause the apparatus to participate in packet-based communication;
   a temperature sensor operably connected to the logic circuitry, configured to provide a temperature of the apparatus to the logic circuitry;
   memory operably connected to the logic circuitry, configured to store a threshold temperature; and
   the logic circuitry being configured to compare the temperature of the apparatus to the threshold temperature, and responsive to a result of the comparison, cause the apparatus to start dropping packets to reduce a data rate of the packet-based communication, the dropping of packets starting at a protocol layer,
   wherein the dropping of packets comprises choosing a packet dropping pattern, and
   wherein the packet dropping pattern is chosen to cause the data rate of the packet-based communication to decrease.

2. An apparatus according to claim 1, wherein the logic circuitry is configured to cause the apparatus to start dropping packets responsive to the temperature exceeding the threshold temperature.

3. An apparatus according to claim 1, wherein the logic circuitry is configured to cause the apparatus to start dropping packets responsive to a determination that the temperature of the apparatus is approaching the threshold temperature within a predetermined time.

4. An apparatus according to claim 1, wherein the packet-based communication is end-to-end protocol-based communication, wherein the protocol is one of:
   transmission control protocol and real-time transport protocol, and wherein the apparatus comprises at least one of an endpoint or an intermediate point of the end-to-end protocol-based communication.

5. An apparatus, comprising:
   at least one processor; and
   at least one memory including computer program code, the at least one memory and the computer program code configured to, with the at least one processor, cause the apparatus to perform at least the following:
   participate in packet-based communication;
   obtain a temperature of the apparatus; and
   compare the temperature of the apparatus to a threshold temperature, and responsive to a result of the comparison, cause the apparatus to start dropping packets to reduce a data rate of the packet-based communication, the dropping of packets starting at a protocol layer,
   wherein the dropping of packets comprises choosing a packet dropping pattern, and
   wherein the packet dropping pattern is chosen to cause the data rate of the packet-based communication to decrease.

6. An apparatus according to claim 5, wherein the at least one memory and the computer program code are configured to cause the apparatus to start dropping packets responsive to the temperature exceeding the threshold temperature.

7. An apparatus according to claim 5, wherein the at least one memory and the computer program code are configured to cause the apparatus to start dropping packets responsive to a determination that the temperature of the apparatus is approaching the threshold temperature within a predetermined time.

8. An apparatus according to claim 5, wherein the at least one memory and the computer program code are configured to cause the apparatus to discontinue dropping packets responsive to a determination that the temperature of the apparatus has decreased below a second threshold temperature.

9. An apparatus according to claim 6, wherein the apparatus is an intermediary device along a communication path of the packet-based communication.

10. A method, comprising:
    causing an apparatus to participate in a packet-based communication;
    obtaining a temperature of the apparatus; and
    comparing the temperature of the apparatus to a threshold temperature, and responsive to a result of the comparison, causing the apparatus to start dropping packets to reduce a data rate of the packet-based communication, the dropping of packets starting at a protocol layer,
    wherein the dropping of packets comprises choosing a packet dropping pattern, and
    wherein the packet dropping pattern is chosen to cause the data rate of the packet-based communication to decrease.

11. A method according to claim 10, further comprising causing the apparatus to start dropping packets responsive to the temperature exceeding the threshold temperature.

12. A method according to claim 10, further comprising causing the apparatus to start dropping packets responsive to a determination that the temperature of the apparatus is approaching the threshold temperature within a predetermined time.

13. A method according to claim 12, further comprising causing the apparatus to discontinue dropping packets responsive to a determination that the temperature of the apparatus has decreased below a second threshold temperature.

14. A computer program product comprising a non-transitory computer-readable medium encoded with instructions that, when executed by at least one processor, perform at least the following:
    causing an apparatus to participate in a packet-based communication;

obtaining a temperature of the apparatus; and comparing the temperature of the apparatus to a threshold temperature, and responsive to a result of the comparison, causing the apparatus to start dropping packets to reduce a data rate of the packet-based communication, the dropping of packets starting at a protocol layer, wherein the dropping of packets comprises choosing a packet dropping pattern, and wherein the packet dropping pattern is chosen to cause the data rate of the packet-based communication to decrease.

15. A computer program product according to claim 14, the instructions further causing the apparatus to start dropping packets responsive to the temperature exceeding the threshold temperature.

16. A computer program product according to claim 14, the instructions further causing the apparatus to start dropping packets responsive to a determination that the temperature of the apparatus is approaching the threshold temperature within a predetermined time.

\* \* \* \* \*